US008660017B2

(12) United States Patent
Robohm

(10) Patent No.: US 8,660,017 B2
(45) Date of Patent: Feb. 25, 2014

(54) SYSTEMS AND METHODS FOR UPDATING IP COMMUNICATION SERVICE ATTRIBUTES USING AN LDAP

(75) Inventor: Kurt W. Robohm, Leesburg, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2212 days.

(21) Appl. No.: 10/097,861

(22) Filed: Mar. 15, 2002

(65) Prior Publication Data
US 2002/0136222 A1 Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
*H04L 12/28* (2006.01)
*H04L 12/66* (2006.01)
*G06F 7/00* (2006.01)

(52) U.S. Cl.
USPC ........... 370/252; 370/352; 707/610; 707/758; 379/201.01

(58) Field of Classification Search
None
See application file for complete search history.

(56) References Cited

U.S. PATENT DOCUMENTS

| | | | |
|---|---|---|---|
| 5,572,438 A * | 11/1996 | Ehlers et al. ............... 700/295 |
| 5,608,720 A | 3/1997 | Biegel et al. |
| 5,666,530 A * | 9/1997 | Clark et al. ............... 1/1 |
| 5,758,343 A | 5/1998 | Vigil et al. |
| 5,812,793 A | 9/1998 | Shakib et al. |
| 5,867,494 A | 2/1999 | Krishnaswamy et al. |
| 5,867,495 A | 2/1999 | Elliott et al. |
| 5,877,759 A | 3/1999 | Bauer |
| 5,910,981 A * | 6/1999 | Bhagat et al. .......... 379/219 |
| 5,999,525 A | 12/1999 | Krishnaswamy et al. |
| 5,999,612 A | 12/1999 | Dunn et al. |
| 5,999,973 A | 12/1999 | Glitho et al. |
| 6,008,805 A | 12/1999 | Land et al. |
| 6,115,741 A | 9/2000 | Domenikos et al. |
| 6,125,391 A | 9/2000 | Meltzer et al. |

(Continued)

FOREIGN PATENT DOCUMENTS

| | | |
|---|---|---|
| WO | 97/22209 | 6/1997 |
| WO | 98/53582 | 11/1998 |

(Continued)

OTHER PUBLICATIONS

"Netscape ECXpert Data Sheet", Netscape.com, copyright 2000, pp. 1-5.

(Continued)

*Primary Examiner* — Steven H Nguyen

(57) ABSTRACT

A system processes calls in an Internet Protocol (IP) communications network. The system includes a lightweight directory access protocol (LDAP) database, an LDAP sever, and a redirect server. The LDAP database stores a group of IP communication service attributes. The LDAP server receive a request for a database update, extracts the group of IP communication service attributes from the LDAP database, and transfers the extracted IP communication service attributes to the redirect server. The redirect server stores the extracted IP communication service attributes and processes a call using the stored IP communication service attributes.

28 Claims, 11 Drawing Sheets

(56) References Cited

U.S. PATENT DOCUMENTS

| | | | |
|---|---|---|---|
| 6,138,245 A * | 10/2000 | Son et al. | 713/400 |
| 6,145,001 A | 11/2000 | Scholl et al. | |
| 6,154,743 A | 11/2000 | Leung et al. | |
| 6,161,008 A * | 12/2000 | Lee et al. | 455/415 |
| 6,175,565 B1 | 1/2001 | McKinnon et al. | |
| 6,175,656 B1 | 1/2001 | Hoang | |
| 6,189,033 B1 | 2/2001 | Jin et al. | |
| 6,192,405 B1 | 2/2001 | Bunnell | |
| 6,192,418 B1 | 2/2001 | Hale et al. | |
| 6,195,697 B1 | 2/2001 | Bowman-Amuah | |
| 6,208,986 B1 | 3/2001 | Schneck et al. | |
| 6,240,174 B1 * | 5/2001 | Silver | 379/230 |
| 6,282,281 B1 | 8/2001 | Low | |
| 6,330,560 B1 | 12/2001 | Harrison et al. | |
| 6,335,927 B1 | 1/2002 | Elliott et al. | |
| 6,353,660 B1 | 3/2002 | Burger et al. | |
| 6,363,421 B2 | 3/2002 | Barker et al. | |
| 6,373,817 B1 | 4/2002 | Kung et al. | |
| 6,381,644 B2 | 4/2002 | Munguia et al. | |
| 6,393,481 B1 | 5/2002 | Deo et al. | |
| 6,418,324 B1 | 7/2002 | Doviak et al. | |
| 6,603,969 B1 | 8/2003 | Vuoristo et al. | |
| 6,615,223 B1 | 9/2003 | Shih et al. | |
| 6,628,767 B1 | 9/2003 | Wellner et al. | |
| 6,643,670 B2 | 11/2003 | Parham et al. | |
| 6,718,348 B1 * | 4/2004 | Novak et al. | 707/201 |
| 6,775,267 B1 | 8/2004 | Kung et al. | |
| 6,778,544 B1 * | 8/2004 | Holiday | 370/410 |
| 6,778,651 B1 | 8/2004 | Jost et al. | |
| 6,779,118 B1 | 8/2004 | Ikudome et al. | |
| 6,826,173 B1 | 11/2004 | Kung et al. | |
| 6,856,676 B1 | 2/2005 | Pirot et al. | |
| 6,904,460 B1 * | 6/2005 | Raciborski et al. | 709/224 |
| 6,909,708 B1 | 6/2005 | Krishnaswamy et al. | |
| 6,968,209 B1 * | 11/2005 | Ahlgren et al. | 455/558 |
| 2001/0032076 A1 | 10/2001 | Kursh | |
| 2001/0037379 A1 | 11/2001 | Livnat | |
| 2001/0037469 A1 | 11/2001 | Gupta et al. | |
| 2001/0049745 A1 | 12/2001 | Schoeffler | |
| 2002/0023232 A1 | 2/2002 | Serani et al. | |
| 2002/0073207 A1 | 6/2002 | Widger et al. | |
| 2002/0091797 A1 | 7/2002 | Wallenius et al. | |
| 2002/0152319 A1 | 10/2002 | Amin et al. | |
| 2003/0023759 A1 | 1/2003 | Littleton et al. | |
| 2003/0091028 A1 * | 5/2003 | Chang et al. | 370/352 |

FOREIGN PATENT DOCUMENTS

| | | |
|---|---|---|
| WO | WO-00/14633 | 3/2000 |
| WO | WO-00/78004 | 12/2000 |
| WO | WO-01/01293 | 1/2001 |

OTHER PUBLICATIONS

Putman, Janis, "Distribution Transparencies for Integrated System", MITRE Corp., Feb. 2000, pp. 1-18.

W. Yeong et al., "Lightweight Directory Access Protocol", RDX 1777, Mar. 1995, pp. 1-16.

"Businessware Overview", www.vitria.com, pp. 1-2, print date Mar. 14, 2002.

"Netegrity SiteMinder 4.6.", www.netegrity.com, p. 1, print date Mar. 14, 2002.

"The iPlanet Web Server Keeps Data Safe", www.iplanet.com, p. 1, print date Mar. 14, 2002.

Snyder, "Using LDAP for Thin Client Configuration," XP002224070, Jun. 5, 1998.

* cited by examiner

SYSTEMS AND METHODS FOR UPDATING IP COMMUNICATION SERVICE ATTRIBUTES USING AN LDAP

RELATED APPLICATION

This application claims priority under 35 U.S.C. §119(e) based on U.S. Provisional Application Ser. Nos. 60/276,923, 60/276,953, 60/276,954, and 60/276,955, all filed Mar. 20, 2001, the disclosures of which are incorporated herein by reference.

FIELD OF THE INVENTION

The present invention relates generally to communications systems and, more particularly, to an operational support system that allows for communication service attributes to be updated through the use of a lightweight directory access protocol (LDAP) directory server.

BACKGROUND OF THE INVENTION

Telecommunications service providers continually increase the number of services and products they offer to customers. A recent trend, for example, is a desire to offer broadband, wireless, and Internet services. As competition increases, service providers must provide an increased level of support for these advanced data services while keeping costs down.

Service providers also desire the ability to allow users (e.g., system administrators, engineers, and customers) to modify attributes associated with these advanced data services and to implement these modifications in near real time. By way of example, an attribute may relate to how Voice over Internet Protocol (VoIP) calls are routed to and from a customer. To ensure that calls are processed correctly after modifications have been made, it is important that the devices used for processing the calls, such as a redirect server, contain the most up to date information. When a redirect server experiences a fault or is taken off-line for some period of time, the redirect server will not contain any updates (or modification) made during this period.

Accordingly, there is a need in the art for a system or method that ensures that redirect servers contain the most up to date information.

SUMMARY OF THE INVENTION

Systems and methods consistent with the principles of this invention address this and other needs by providing an operational support system that ensures that redirect servers are kept up to date with the most recent attributes for processing calls in an Internet Protocol (IP) communications network.

In an implementation consistent with the present invention, a system that processes calls in an IP communications network is disclosed. The system includes an LDAP database, an LDAP sever, and a redirect server. The LDAP database stores a group of IP communication service attributes. The LDAP server receives a request for a database update, extracts the group of IP communication service attributes from the LDAP database, and transfers the extracted IP communication service attributes to the redirect server. The redirect server stores the extracted IP communication service attributes and processes a call using the stored IP communication service attributes.

In another implementation consistent with the present invention, a method for updating a redirect server storing a group of records is disclosed. The method includes sending a request for a partial database update to an LDAP server, where the LDAP server is associated with a database that stores a group of records that corresponds to the group of records stored by the redirect server. The method further includes comparing each of the records stored at the redirect server to the corresponding records stored in the database, extracting records from the database that differ from the corresponding records stored at the redirect server, transferring the extracted records to the redirect server, and storing the extracted records at the redirect server.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of this invention provide an operational support system that ensures that redirect servers are kept up to date with the most recent attributes for processing calls in an IP communications network.

Exemplary System

Figure 1:
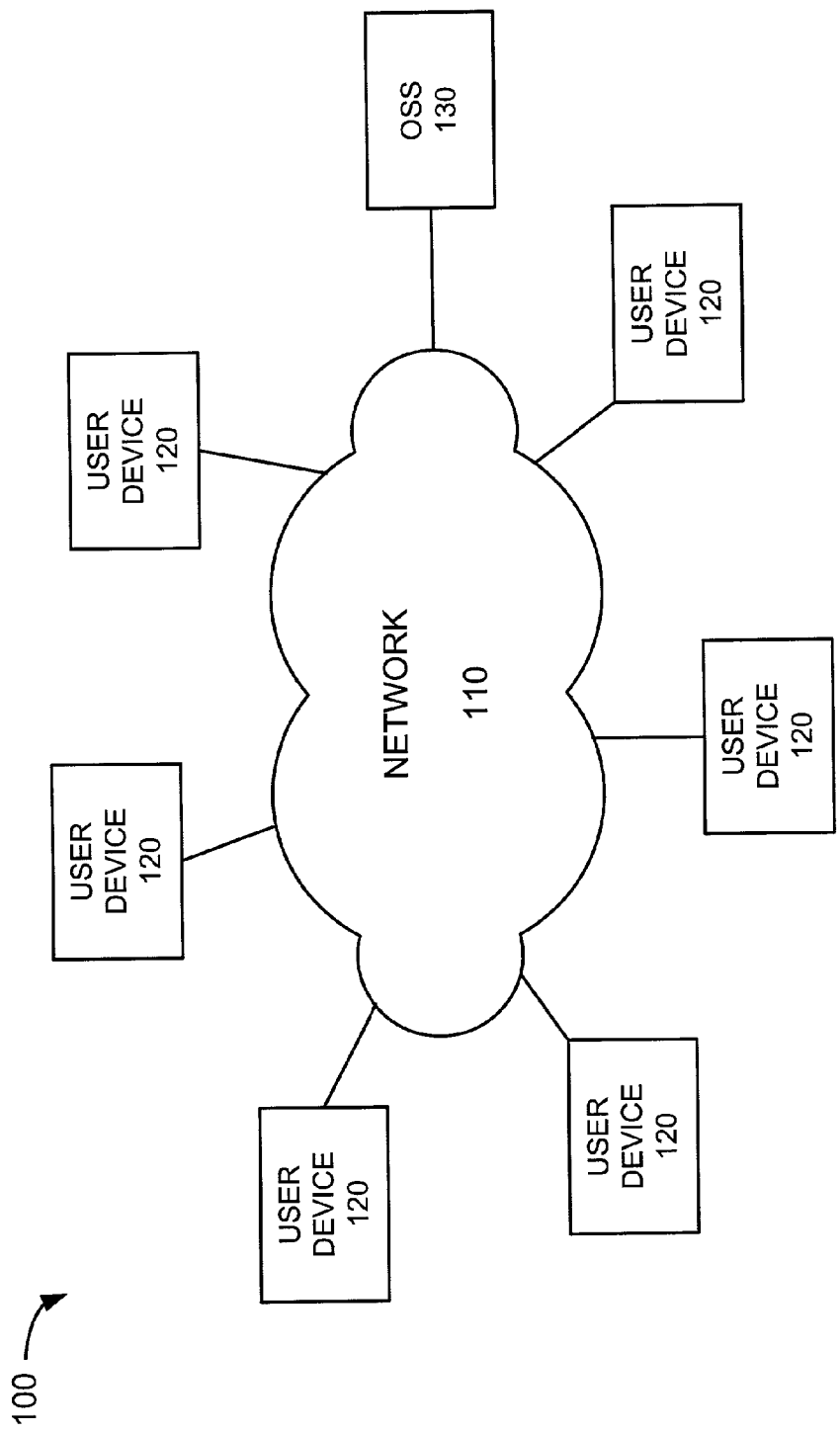
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, system 100 includes a network 110 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
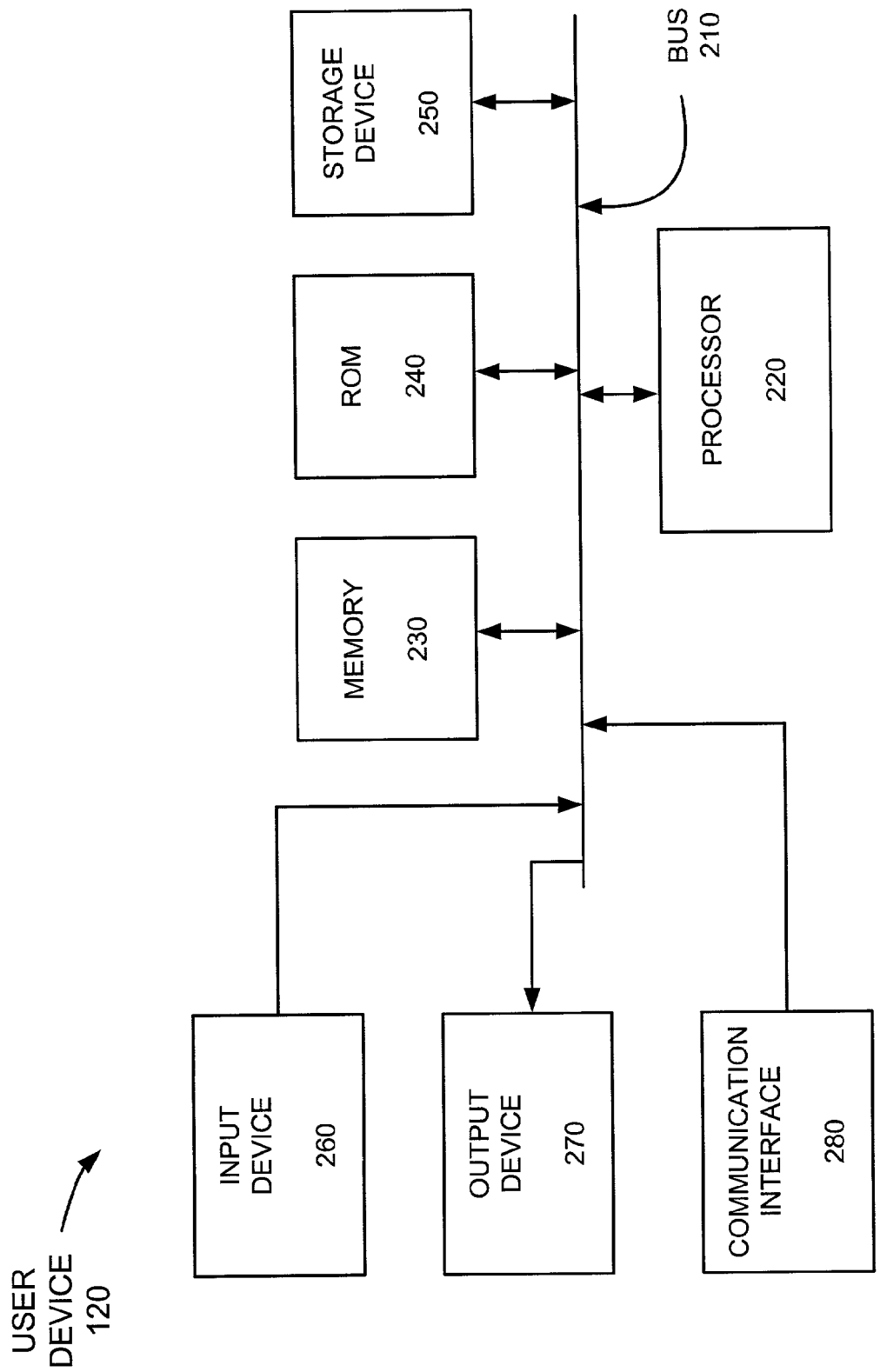
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism or combination of mechanisms that permits an operator to input information to the user device 120, such as a keyboard, a mouse, a microphone, a pen, a biometric input device, such as voice recognition device, etc. The output device 270 may include any conventional mechanism or combination of mechanisms that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network.

Returning to FIG. 1, the OSS 130 provides the infrastructure for integrating data from traditional telephony services and applications with advanced data application platforms. Through OSS 130, customers, using, for example, user device 120, may manage, configure, and provision traditional telephony and advanced data services in real time, obtain real time billing information, and generate reports using a rules-centric middleware core. In one embodiment, a customer may perform these functions through a single point of entry using an Internet accessible web interface.

Figure 3:
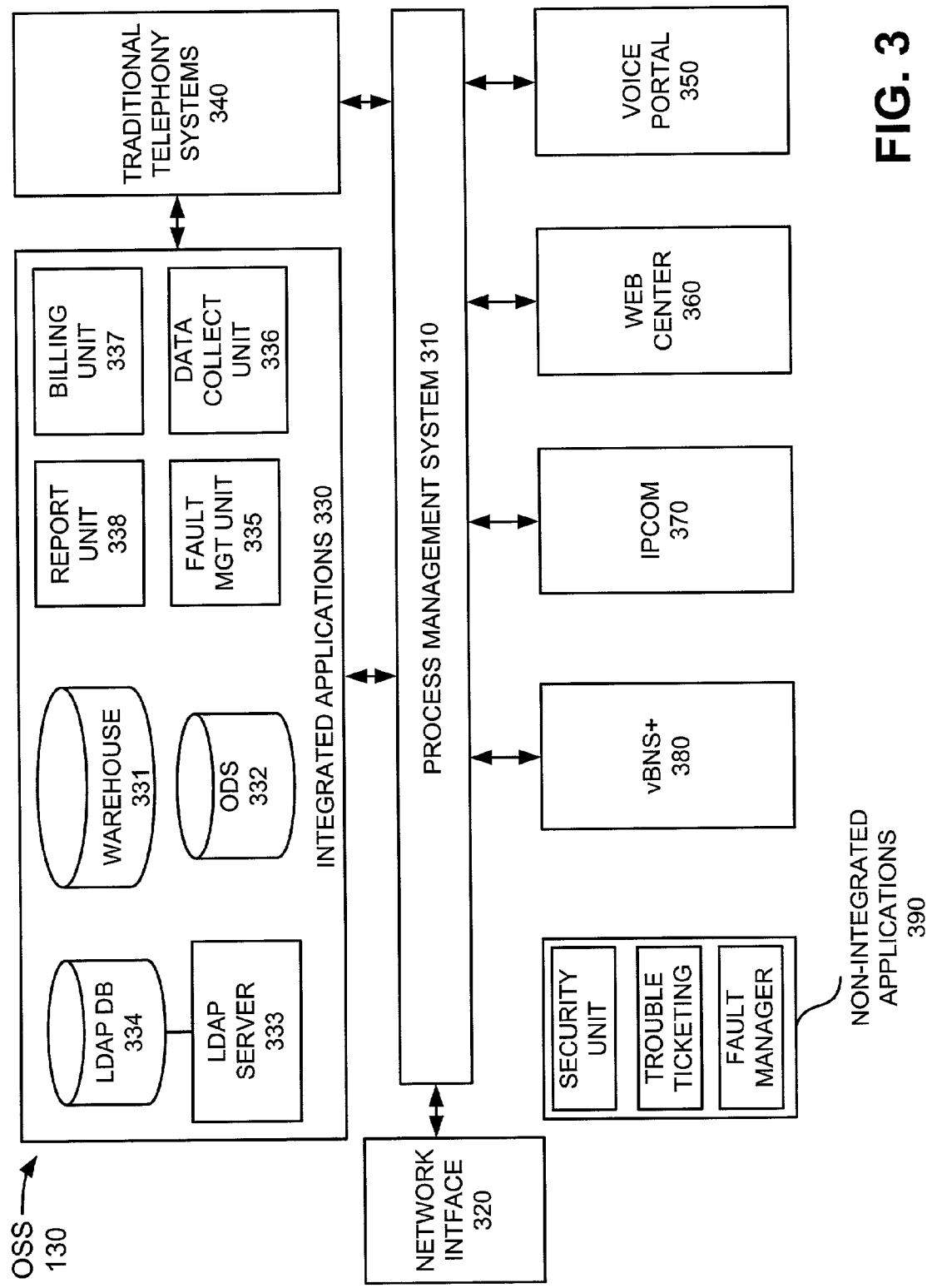
FIG. 3 illustrates an exemplary configuration of the operational support system of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an IPCOM unit 370, a very high performance backbone network service (vBNS+) unit 380, and a group of non-integrated applications 390. It will be appreciated that the OSS 130 may include other components (not shown) that aid in receiving, processing, and/or transmission of data.

The process management system 310 acts as the backbone to the OSS 130 by providing graphical process automation, data transformation, event management, and flexible connectors for interfacing with OSS components. In one implementation consistent with the present invention, the process management system 310 uses a Common Object Request Broker Architecture (CORBA) based publish-and-subscribe messaging middleware to integrate the different components of the OSS 130. Other techniques for integrating the different components of the OSS 130 may alternatively be used, such as eXtensible Markup Language (XML) or Enterprise Java-Beans (EJB). The process management system 310 may, for example, be implemented using Vitria Technology Inc.'s BusinessWare software system.

The network interface 320 provides a graphical user interface that allows users (e.g., customers, engineers, account teams, and the like) to access the components of the OSS 130. The network interface 320 may include commercial off the shelf (COTS) software or hardware packages, such as Site-minder® by Netegrity, Inc. and/or iPlanet™ by Sun Microsystems, Inc., custom software or hardware, or a combination of custom software/hardware and COTS software/hardware.

Via the network interface 320, customers may, for example, request that service be connected or disconnected, monitor or change network or user settings, obtain reports, and perform e-billing, account management, and trouble reporting and tracking functions in a real time manner. The network interface 320 may, for example, allow engineers to submit transactions to control and configure network elements and services in a real time manner. The network interface 320 may, for example, allow account teams to manage account creations and cancellations, generate sub-accounts from master accounts, access current account data, and access historical account data. As will be described in additional detail below, the network interface 320 allows the service attributes associated with the IPCOM unit 370 to be configured and controlled remotely, such as over the Internet.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130. Once authenticated, users may access those components of the OSS 130 to which they have been provided authorization.

The integrated applications 330 may include, for example, a data warehouse 331, an operational data store (ODS) 332, a lightweight directory access protocol (LDAP) based server 333, an LDAP database 334, a fault management unit 335, a data collection unit 336, a billing unit 337 and a reporting unit 338. The data warehouse 331 may include one or more separate databases for storing data. The data warehouse 331 acts as a repository for service order, account, usage and performance data. In one implementation, the data warehouse 331 may be implemented as a relational database management system (RDBMS) and may include a server (not shown) that controls access to the data warehouse 331.

The ODS 332 may also include one or more separate databases for storing data. The ODS 332 temporarily stores data that is used in the course of fulfilling, for example, account creation, service order management, and network provisioning operations. The ODS 332 also stores authentication and authorization data. This data defines users' roles and privileges. Like the data warehouse 331, the ODS 332 may be a RDBMS and may include a server (not shown) that controls access to the ODS 332.

The LDAP server 333 may be a general directory server that controls access to the LDAP database 334. The LDAP database 334 may be an LDAP-based repository that stores information associated with users in a hierarchical, tree-like structure. For example, the LDAP database 334 may store attributes for a user that may include preferences associated with the following exemplary services: call blocking, follow-me, call forwarding, voice mail, conference calling, single line extension, call screening, quality of service, class of service, dial plan restrictions, dynamic registration, secondary directory number and call transfer. The LDAP database 334 may store this information as one or more directory entries for each user. Each directory entry may include an identifier associated with the user and a collection of attributes associated with the user. Each of the attributes may include a type and one or more values that identify the user's settings associated with that type. In this manner, the LDAP server 333 and LDAP database 334 provide a system that enables the user's preferences regarding various services to be stored, searched, updated and retrieved in a quick and efficient manner.

The LDAP server 333 and LDAP database 334 are shown as separate devices. It should be understood, however, that these two devices may both be part of the same directory server in implementations consistent with the present invention. Additional information regarding LDAP can be found in W. Yeong et al., "Lightweight Directory Access Protocol," RFC 1777, March 1995, which is incorporated herein by reference.

The fault management unit 335 monitors and manages the operation of the OSS 130. The fault management unit 335 may receive information from every device, computer and application in the OSS 130 via the process management system 130. In situations where a fault has been detected, the fault management unit 335 may transmit a trouble ticket identifying the fault to the appropriate system administrator.

The data collection unit 336 collects customer usage and performance data for the devices supported by the OSS 130, transforms the data, if necessary, and passes the data on to the appropriate device, such as the billing unit 337. In one implementation, the data collection unit 336 utilizes a hierarchical architecture, having a centralized manager that defines and manages collection and data transformation schemas. Individual, lower level gatherers interface with source targets.

The billing unit 337 receives customer usage and performance data from the data collection unit 336 and generates bills in a well-known manner based thereon. The billing unit 337 may be configured with a variety of rating rules and plans and may provide mechanisms to manage and create rating plans, as well as mechanisms for building revenue reports and generating billing reports. The rating rules may be customized based on a particular customer's requirements or generalized. The rating rules may include traditional telephony styled rating rules that include time-of-day, day-of-week, distance-based, flat rate, non-recurring, and recurring on a definably regular basis, such as weekly, bi-weekly, monthly, etc., ratings. In an exemplary implementation of the present invention, the billing unit 337 may also provide bonus points, airline miles, and other incentive items as part of the rules-based rating and billing service.

Billing unit 337 may provide revenue and billing reports to authorized parties. Billing unit 337 may allow customers to access previous invoices and view current charges not yet billed. In an exemplary implementation consistent with the present invention, billing unit 337 may transfer rated events and summary records into other billing and revenue systems. For example, billing unit 337 may receive and transfer billing information or event information to a legacy billing system (i.e., an existing billing system) that generates the actual bill. In alternative implementations, billing unit 337 may provide hard copy bills and/or provide electronic bills to a customer. In this implementation, billing unit 337 may be configured to perform electronic payment handling.

As customer orders and accounts are created or modified through normal business functions, the OSS 130 keeps the billing unit 337 up to date in a real time manner via the process management system 310. Authorized parties may also extract real time data from the billing unit 337.

The reporting unit 338 may interact with various components of the OSS 130, such as the ODS 332 and billing unit 337, to provide users (i.e., customers, engineers, and accountants) with the ability to obtain reports based on real time data. The reports may include, for example, billing reports, reports regarding the usage and/or performance of the network, etc.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant, a paging device, and the like) and may also track a subscriber's access to the services for billing purposes.

The web center 360 acts as a virtual call center by queuing, routing, and distributing communications from any first location to an appropriate agent at any second location. The web center 360 allows agents to handle multiple mediums (e.g., inbound telephone calls, faxes, e-mails, voicemail, VoIP transactions, etc.) via a single browser-based interface.

The IPCOM unit 370 may include one or more devices that provide VoIP services to subscribers. The subscribers may make and receive calls via an IP communications network using, for example, session initiation protocol (SIP) telephones. The IPCOM unit 370 may support the following exemplary services: follow me, call blocking, call forwarding, voice mail, conference calling, single line extension, call screening, quality of service, class of service, dial-plan restrictions, dynamic registration, secondary directory number, and call transfer. As described above, customers may set or change attributes associated with these features via the network interface 320.

The vBNS+ unit 380 provides the IP infrastructure for the IP communications network. The vBNS+ unit 380 may include a group of routers that route packets in the network. The non-integrated applications 390 may include, for example, a security unit, a trouble ticketing unit, and a fault manager. The security unit may include one or more firewalls for securing the network interface 320, telephone equipment (e.g., PBX, switch, and redirect server), and network operations. The trouble ticketing unit manages the issuance and resolution of trouble tickets. The fault manager monitors the hardware components of the OSS 130.

Figure 4:
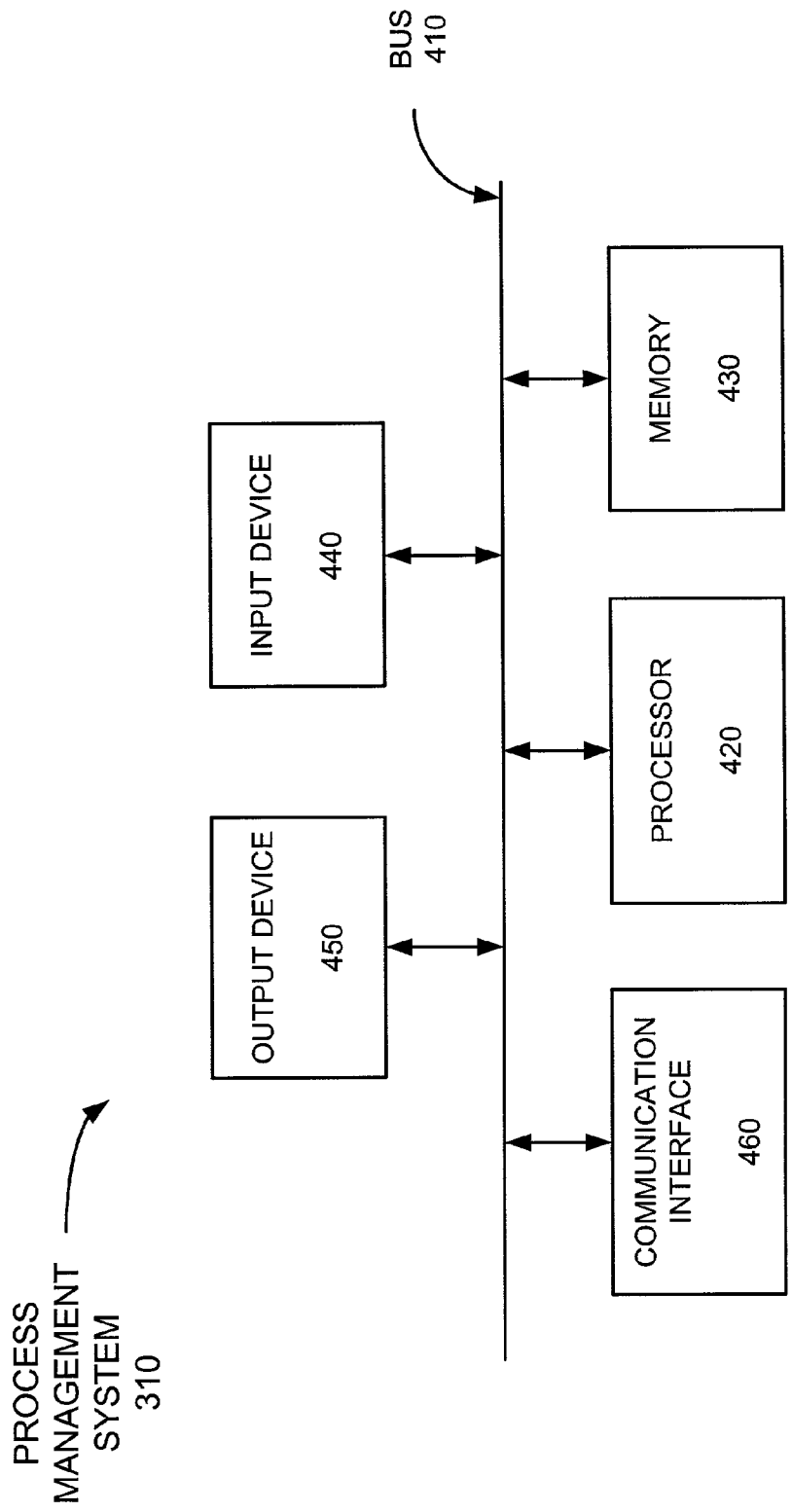
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism or combination of mechanisms that permits an operator to input information to the process management system 310, such as a keyboard, a mouse, a pen, a biometric mechanism, and the like. The output device 450 may include any conventional mechanism or combination of mechanisms that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

Execution of the sequences of instructions contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
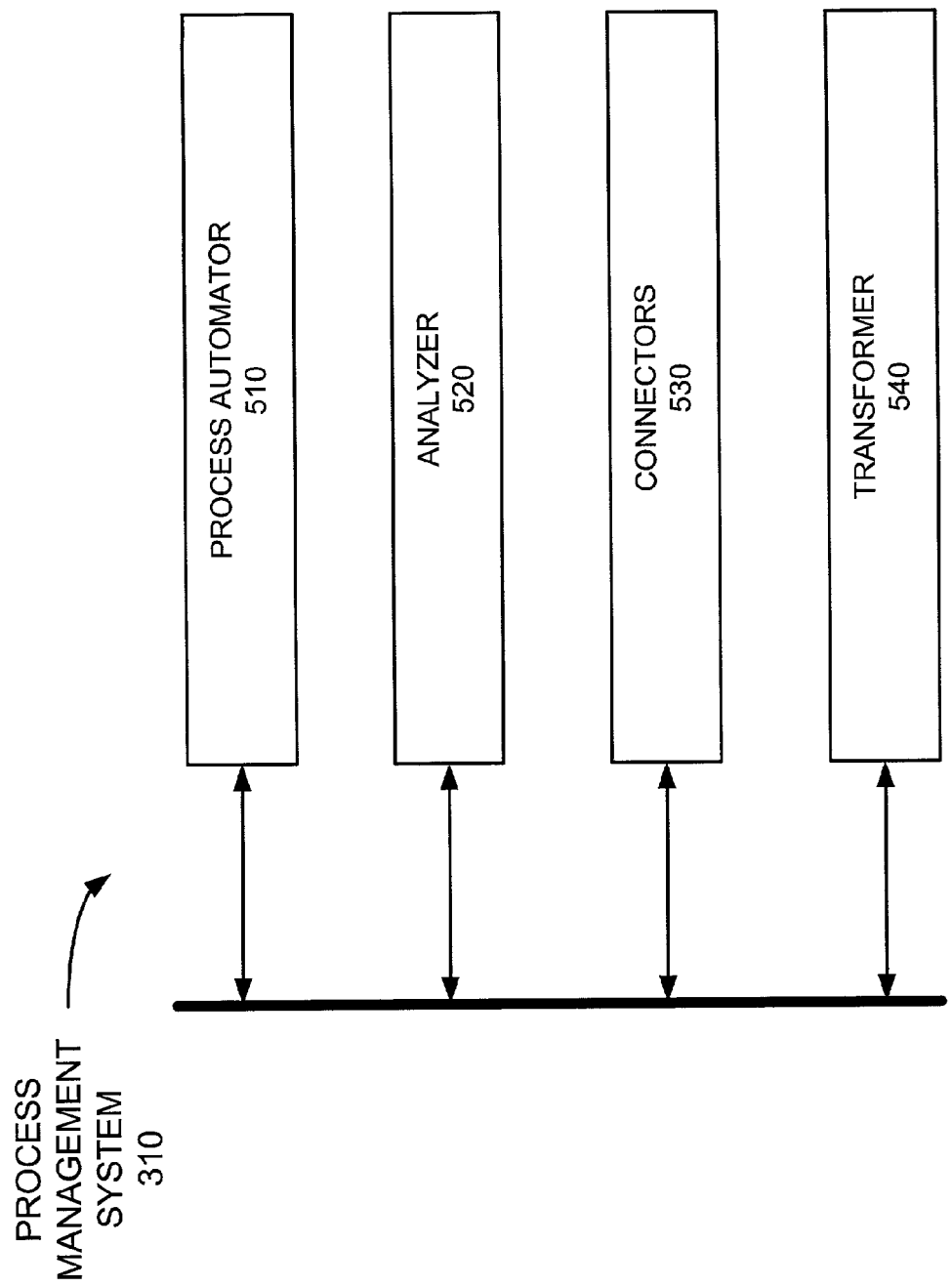
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, and a transformer 540. It will be appreciated that the process management system 310 may include additional functional elements (not shown) that aid in the reception, processing, and/or transmission of data.

The processor automator 510 includes a modeling tool that allows event processing to be visually modeled by engineers and product development analysts. The process automator 510 can then execute these models to create an automated business process. The analyzer 520 provides on-going and real time monitoring of the components of the OSS 130. The analyzer 520 delivers reports, history, and trending on events processed through the process management system 310.

The connectors 530 include a group of customized rules that allows the components of the OSS 130 to interact and communicate with the process management system 310. A unique connector 530 may be established for each component in the OSS 130. As new components are added to the OSS 130, new connectors 530 are established to allow the new components to communicate with the existing components of the OSS 130. Once the connectors 530 have been established, the OSS components may communicate with the process management system 310 via standard messaging or through full publish/subscribe processing. The transformer 540 inspects data received by the connectors 530. The transformer 540 may also transform the data received by the connectors 530, if necessary, prior to the data being transferred on to its destination.

Figure 6:
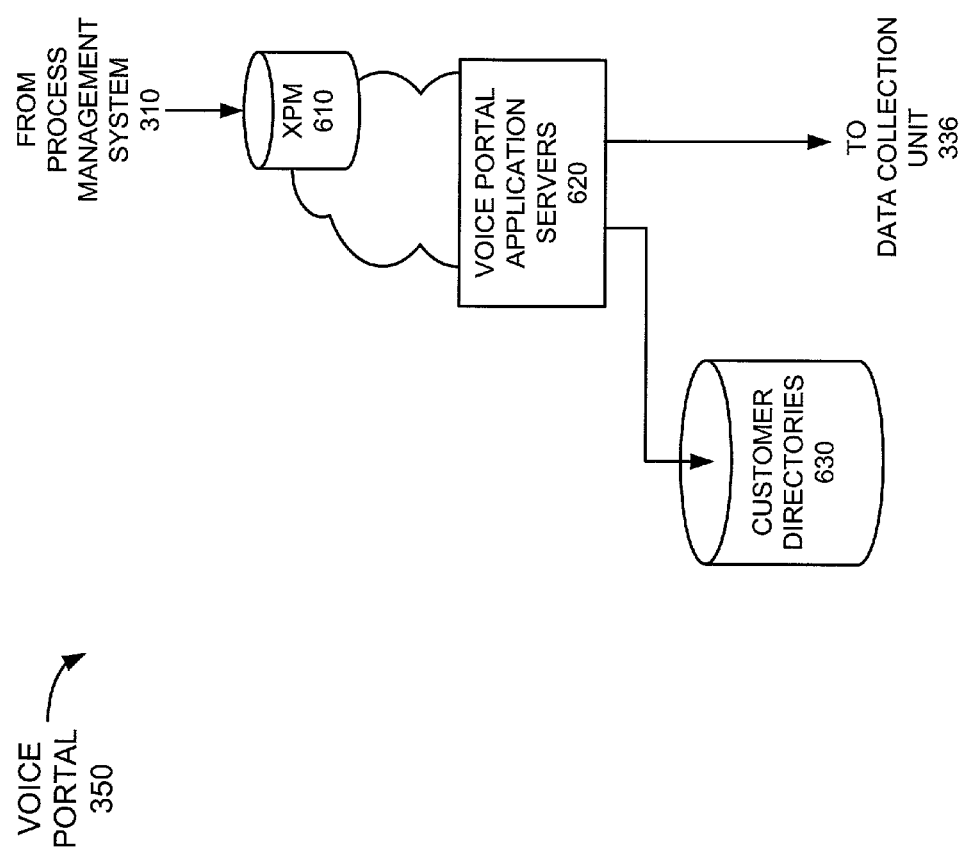
FIG. 6 illustrates an exemplary configuration of the voice portal unit of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an eXtensible Program Management (XPM) unit 610, one or more voice portal application servers 620, and a customer directory database 630. The XPM unit 610 receives user profile information from the network interface 320 via the process management system 310 and stores this information for use by the voice portal application servers 620. The XPM unit 610 may also receive other information, such as information identifying the device(s) (e.g., personal digital assistant, cellular telephone, pager, etc.) by which the customer wishes to receive the service(s) provided.

The voice portal application servers 620 may include one or more servers that interact with the XPM unit 610 to provide, for example, banking, brokerage, and financial services, travel and entertainment services, distribution and shipping services, insurance services, health and pharmaceutical services, manufacturing services, and the like. Voice portal application servers 620 may also provide data collection unit 336 with information regarding what services are accessed and by whom. The data collection unit 336 may then pass this information on to the billing unit 337 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real time sports scores, etc.

Figure 7:
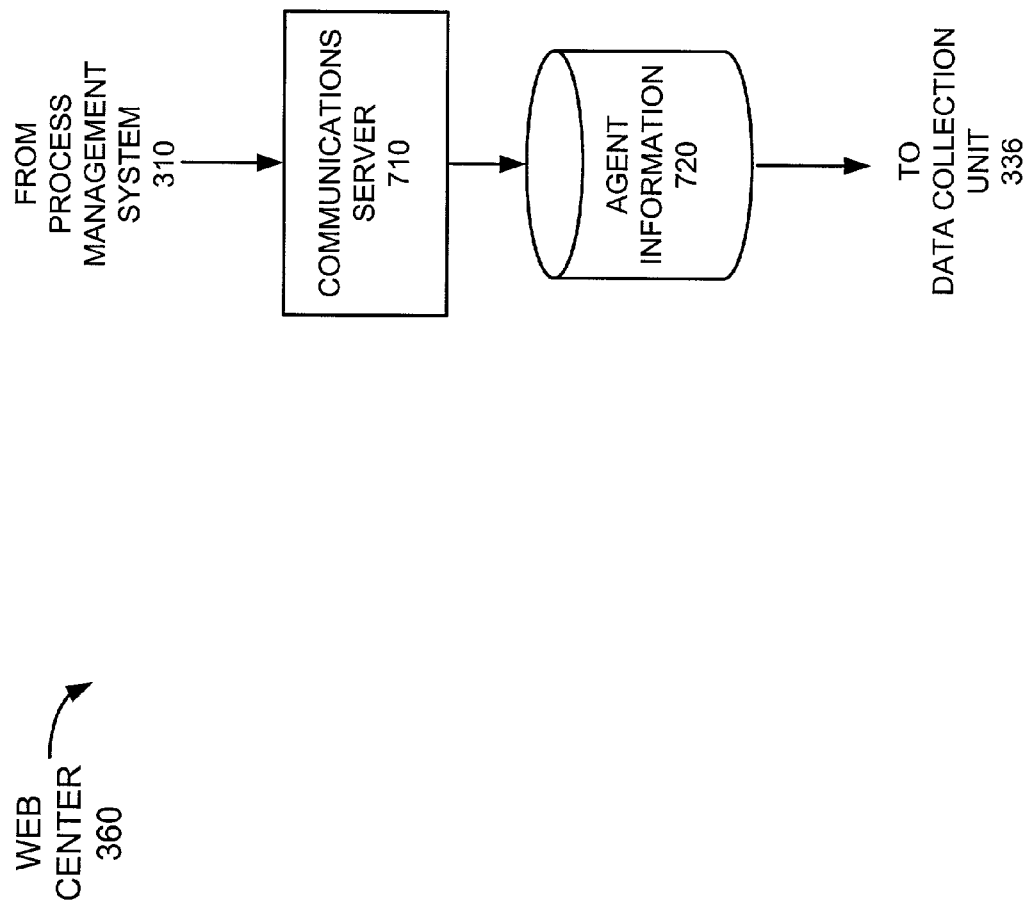
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communications server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 336 and then to the billing unit 337 for billing. Users may, via the network interface 320, provision new services, such as order a toll free number, and/or create new accounts at the web center 360.

Figure 8:
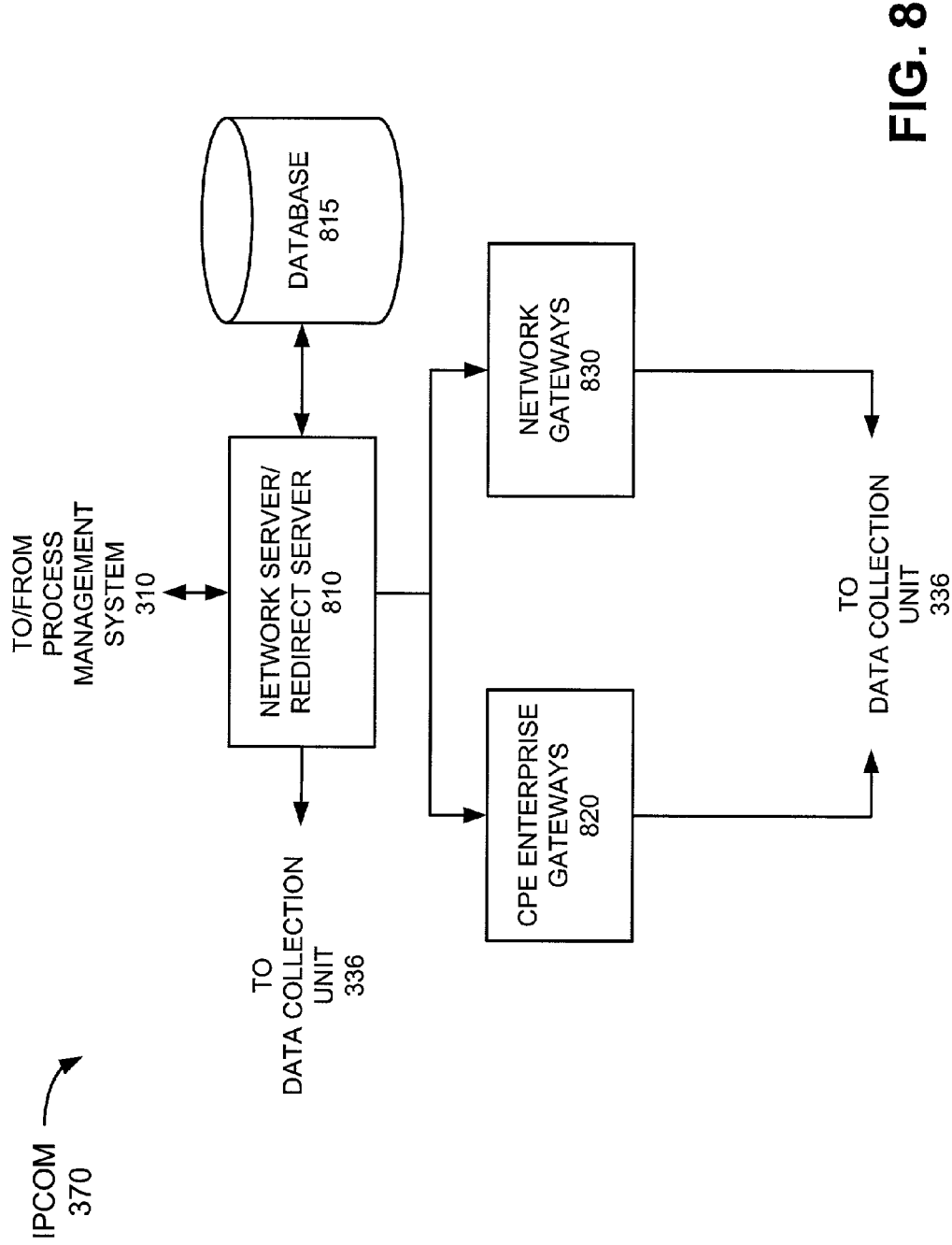
FIG. 8 illustrates an exemplary configuration of the Internet Protocol Communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a network server/redirect server 810, CPE enterprise gateways 820, and network gateways 830. The network server/redirect server 810 processes calls made over the IP communications network based on data stored in an associated database 815. The database 815 may store data (or records) relating to call processing (e.g., information identifying the device by which the subscriber wishes to receive the call, network configuration information, etc.), subscriber profiles (e.g., subscriber identifiers), and network-supported features. The network server/redirect server 810 may direct calls to the appropriate gateway 820 or 830 based on this data. The network-supported features may include, for example, follow me, call blocking, call forwarding, voice mail, conference calling, single line extension, call screening, quality of service, class of service, dial-plan restrictions, dynamic registration, secondary directory number, and call transfer.

The CPE enterprise gateways 820 may include one or more gateways for linking customer systems to the IP communications network. The CPE enterprise gateways 820 may, for example, connect to a customer's PBX and convert time division multiplexed (TDM) voice data into VoIP packets and voice signaling into SIP messages. The network gateways 830 include one or more gateways for linking the IP communications network to the PSTN in a well-known manner. The redirect server 810, CPE enterprise gateways 820, and network gateways 830 track customer access and transmit this customer access data to the data collection unit 336 for billing purposes.

Figure 9:
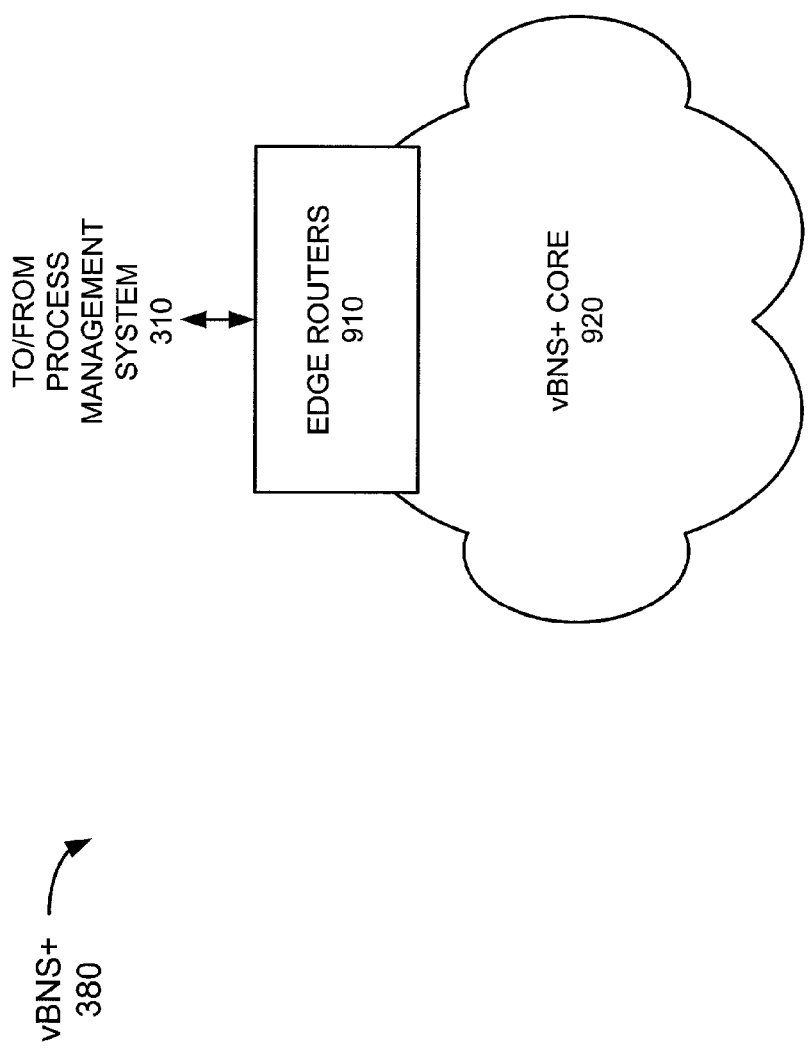
FIG. 9 illustrates an exemplary configuration of the very high performance backbone network service unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server/redirect server 810, network gateways 830, customer's CPE equipment, other routers in the IP communications network, directly to SIP telephones, etc. The edge routers 910 may be configured or updated via the network interface 320. The vBNS+ core 920 may include one or more core routers for routing packets between edge routers 910.

The foregoing description of the OSS 130 provides an overview of the components of the OSS 130. A more detailed description of the present invention is provided below.

Exemplary Processing

Some of the products and services supported by the OSS 130 enable various users (e.g., customers, engineers, accounting personnel, etc.) to submit additions, cancellations, and updates to services offered by the OSS 130. It is important that these changes be made available in near real time. The present invention is directed to systems and methods for ensuring that the redirect server 810 contains the most recent service attributes for processing calls in the IP communications network.

Users may submit an addition, cancellation, or update to an attribute associated with an IP communications service via the network interface 320. The network interface 320 forwards the new data to the process management system 310, which writes the new data simultaneously to the warehouse 331 and the ODS 332. The process management system 310 also acts as a receiver for data coming back out of the ODS 332 in the form of formatted provisioning and configuration records destined for delivery to the redirect server 810. After the process management system 310 receives confirmation that the redirect server 810 has been updated with the new data, the process management system 310 takes a copy of the records transmitted to the redirect server 810 and updates the LDAP database 334 with the new data. In this way, the process management system 310 ensures that the LDAP database 334 has the latest information.

Figure 10:
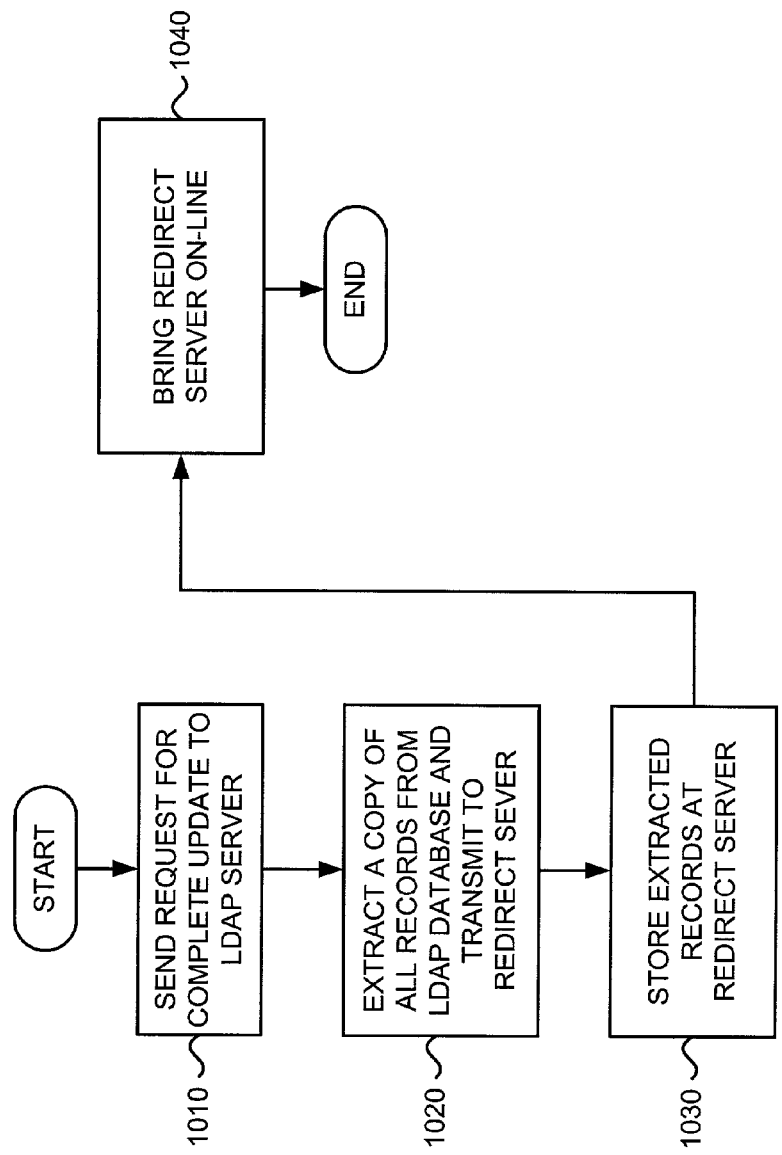
FIG. 10 illustrates an exemplary process for completely updating a redirect server in an implementation consistent with the present invention.

When a new redirect server 810 is brought on-line, it is important that the new redirect server 810 contain the most recent IP communications service information. FIG. 10 illustrates an exemplary process for completely updating a redirect server 810 in an implementation consistent with the present invention. Processing may begin with the redirect server 810 being powered up. Upon power up, the redirect server 810 may transmit a request to the LDAP server 333 for a complete database update [act 1010]. The redirect server 810 may transmit this request automatically upon power up or in response to a command from a system administrator.

Upon receipt of the update request, the LDAP server 333 accesses the LDAP database 334, extracts the records therefrom, and transmits these records to the redirect server 810 [act 1020]. Upon receipt, the redirect server 810 may store the records in database 815 [act 1030]. The redirect server 810 may then be brought on-line [act 1040]. In this way, the OSS 130 ensures that the new redirect server 810 contains the most recent information for processing calls to and from subscribers of the IP communications services.

It is also important to update an existing redirect server 810 when the redirect server 810 experiences a fault or is down for some period of time. In this situation, it is generally not necessary to completely update the redirect server 810. Instead, it may be much faster to provide the redirect server 810 with only those updates that occurred while the redirect server 810 was off-line or down.

Figure 11:
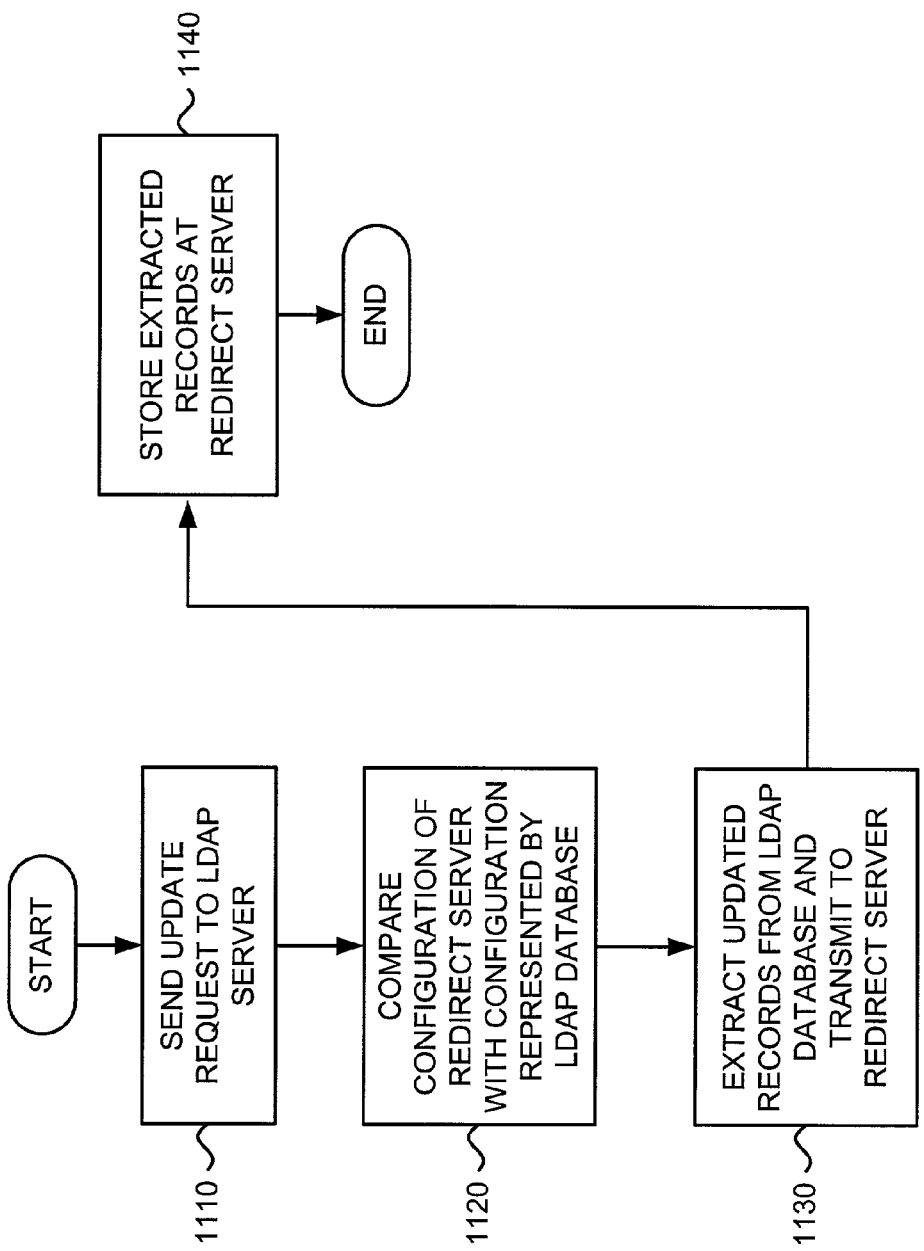
FIG. 11 illustrates an exemplary process for partially updating a redirect server in an implementation consistent with the present invention.

FIG. 11 illustrates an exemplary process for partially updating a redirect server 810 in an implementation consistent with the present invention. Processing may begin with the redirect server 810 being powered up. Upon power up, the redirect server 810 may transmit a request to the LDAP server 333 for a partial database update [act 1110]. The redirect server 810 may transmit this request automatically upon power up or in response to a command from a system administrator. The partial update request may include the current configuration of the redirect server 810 (i.e., the configuration of the current records stored in the redirect server's database 815).

Upon receipt of the partial update request, the LDAP server 333 may compare the configuration of the redirect server 810 to the configuration represented in the LDAP database 334 to determine whether any updates have been made while the redirect server 810 was off-line [act 1120]. If the LDAP server 333 identifies any updates, it extracts the updated records from the LDAP database 334 and transmits these updated records to the redirect server 810 [act 1130]. Upon receipt, the redirect server 810 may store these updated records in database 815 [act 1140]. The redirect server 810 may then be brought on-line. In this way, the OSS 130 ensures that the any redirect server 810 that has been off-line for any period of time contains the most recent information for processing calls to and from subscribers of the IP communications services.

It will be appreciated that the comparison operation described above with respect to act 1120 may alternatively be performed by the redirect server 810. In this situation, the LDAP server 333 may transmit the current configuration of the LDAP database 334 to the redirect server 810. If the redirect server 810 determines that updates exist, it may transmit a request for those updated records to the LDAP server 333. The LDAP server 333 may extract the requested records and send them to the redirect server 810 for storage.

Conclusion

Implementations consistent with the present invention provide an operational support system that ensures that redirect servers are kept up to date with the most recent attributes for processing calls in an IP communications network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, it will be appreciated that the present invention can be implemented in hardware, software, or a combination of hardware and software. Thus, the present invention is not limited to any specific combination of hardware circuitry and software.

Moreover, while series of acts have been described with respect to FIGS. 10 and 11, the order of the acts may vary in other implementations consistent with the present invention. In addition, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method comprising:
   receiving, at an interface and from a user, information for updating one or more Internet Protocol (IP) communication service attributes;
   forwarding, by the interface, the information to a processor;
   storing, by the processor, the information in a memory;
   formatting the received information to produce updated records;
   receiving, at the processor and from the memory, the updated records;
   transferring, by the processor, the updated records to a redirect server;
   storing the updated records at the redirect server;
   storing, by the processor, a copy of the updated records at a database associated with a lightweight directory access protocol (LDAP) server,
      the database storing a plurality of IP communication service attributes;
   sending, from the redirect server and to the LDAP server, in response to the redirect server being powered up after a period of being offline, and prior to the redirect server being brought online, a request for a database update;
   extracting the plurality of IP communication service attributes from the database in response to receiving the request;
   transferring the extracted IP communication service attributes to the redirect server; and
   storing the plurality of IP communication service attributes at the redirect server.

2. The method of claim 1 further comprising:
   processing, after the storing the copy, a call based on one or more of the plurality of IP communication service attributes.

3. The method of claim 1 where the plurality of IP communication service attributes includes attributes relating to one or more of follow me, call blocking, call forwarding, voice mail, conference calling, single line extension, call screening, quality of service, class of service, dial-plan restrictions, dynamic registration, secondary directory number, or call transfer processing.

4. The method of claim 1 where the storing the copy includes:
   storing the plurality of IP communication service attributes in a database associated with the redirect server.

5. The method of claim 1 where the sending occurs in response to a command from a user.

6. A system comprising:
   a network interface to:
      receive, from a user, information for updating one or more Internet Protocol (IP) communication service attributes, and
      forward the received information to a process management system;
   a data storage to format the received information to produce updated records;
   the process management system to:
      receive the information from the network interface,
      forward the information to the data storage,
      receive, from the data storage, the updated records,
      transfer the updated records to a redirect server,
      receive confirmation that the redirect server has been updated with the updated records, and
      store, after the confirmation has been received, a copy of the updated records at a database associated with a lightweight directory access protocol (LDAP) server, the database storing a plurality of IP communication service attributes;
   the LDAP server to:
      receive a request for a database update,
      extract the plurality of IP communication service attributes from the LDAP database, and
      transfer the extracted IP communication service attributes; and
   the redirect server to:
      receive the extracted IP communication service attributes from the LDAP server,
      store the extracted plurality of IP communication service attributes, and
      process a call using one or more of the stored plurality of IP communication service attributes.

7. The system of claim 6 where the plurality of IP communication service attributes includes attributes relating to one or more of follow me, call blocking, call forwarding, voice mail, conference calling, single line extension, call screening, quality of service, class of service, dial-plan restrictions, dynamic registration, secondary directory number, or call transfer processing.

8. The system of claim 6 where the redirect server is further to:
   transmit the request to the LDAP server.

9. The system of claim 8 where the redirect server transmits the request automatically upon powering up.

10. The system of claim 8 where the redirect server transmits the request in response to a command from a user.

11. The system of claim 10 where the user is a system administrator.

12. The system of claim 6, where the process management system is further to:
   route communications between the LDAP server and the redirect server.

13. The system of claim 6 where, when storing the extracted plurality of IP communication service attributes, the redirect server is to:
store the extracted plurality of IP communication service attributes in a database associated with the redirect server.

14. A method comprising:
receiving, at an interface and from a user, information for updating one or more Internet Protocol (IP) communication service attributes;
forwarding, by the interface, the information to a processor;
storing, by the processor, the information in a memory;
formatting the received information to produce updated records;
receiving, by the processor, the updated records;
transferring, by the processor, the updated records to a redirect server;
storing the updated records at the redirect server;
storing, by the processor, a copy of the updated records at a database associated with a lightweight directory access protocol (LDAP) server,
the database storing a plurality of IP communication service attributes;
sending, in response to the redirect server being powered up after a period of being offline, and prior to the redirect server being brought online, a request for a database update to the LDAP server;
comparing, in response to the request, each of the plurality of records stored at the redirect server to the corresponding records stored in the database;
extracting records from the database that differ from the corresponding records stored at the redirect server;
transferring the extracted records to the redirect server; and
storing the extracted records at the redirect server.

15. The method of claim 14 where the plurality of records relate to Internet Protocol (IP) communication service attributes.

16. The method of claim 15 where the plurality of records includes attributes relating to one or more of follow me, call blocking, call forwarding, voice mail, conference calling, single line extension, call screening, quality of service, class of service, dial-plan restrictions, dynamic registration, secondary directory number, or call transfer processing.

17. The method of claim 14 where the comparing is performed by the LDAP server.

18. The method of claim 14 where the comparing is performed by the redirect server.

19. The method of claim 14 where the sending occurs in response to a command from a user.

20. The method of claim 14 where the user is a system administrator.

21. The method of claim 14 where the storing the extracted records includes:
storing the extracted records in a database associated with the redirect server.

22. A system comprising:
a network interface to:
receive, from a user, information for updating one or more Internet Protocol (IP) communication service attributes, and
forward the received information to a process management system;
a data storage to format the received information to produce updated records;
the process management system to:
receive the information from the network interface,
forward the information to the data storage,
receive, from the data storage, the updated records,
transfer the updated records to the redirect server,
receive confirmation that the redirect server has been updated with the updated records, and
store, when the confirmation has been received, a copy of the updated records at a database associated with a lightweight directory access protocol (LDAP) server,
the database storing a second configuration of records corresponding to the first configuration of records; and
the LDAP server to:
receive a request for a partial database update from the redirect server,
compare the first configuration of records to the second configuration of records,
extract records from the second configuration that differ from the corresponding records in the first configuration, and
transfer the extracted records to the redirect server for storage.

23. The system of claim 22 where the first configuration of records and the second configuration of records include IP communication service attributes.

24. The system of claim 23 where the first configuration of records and the second configuration of records include attributes relating to one or more of follow me, call blocking, call forwarding, voice mail, conference calling, single line extension, call screening, quality of service, class of service, dial-plan restrictions, dynamic registration, secondary directory number, or call transfer processing.

25. The system of claim 22 where the redirect server sends the partial database update request automatically in response to the redirect server powering up.

26. The system of claim 22 where the redirect server sends the partial database update request in response to a command from a user.

27. The system of claim 26 where the user is a system administrator.

28. The system of claim 22 where the LDAP server transfers the extracted records to the redirect server for storage in a database associated with the redirect server.

* * * * *